(12) United States Patent
Ha

(10) Patent No.: US 8,760,446 B2
(45) Date of Patent: Jun. 24, 2014

(54) IMAGE PROCESSING APPARATUS PERFORMING RENDERING USING MULTIPLE VIEWPOINTS AND METHOD

(75) Inventor: In Woo Ha, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 500 days.

(21) Appl. No.: 12/662,287

(22) Filed: Apr. 8, 2010

(65) Prior Publication Data

US 2011/0018863 A1    Jan. 27, 2011

(30) Foreign Application Priority Data

Jul. 21, 2009    (KR) ........................ 10-2009-0066251

(51) Int. Cl.
*G06T 15/00*    (2011.01)
(52) U.S. Cl.
USPC ........................................................ 345/419
(58) Field of Classification Search
USPC ........................................................ 345/419
See application file for complete search history.

(56) References Cited

U.S. PATENT DOCUMENTS

| | | | |
|---|---|---|---|
| 5,953,014 A * | 9/1999 | Wood | 345/422 |
| 6,175,379 B1 * | 1/2001 | Uomori et al. | 348/47 |
| 2006/0181758 A1 * | 8/2006 | Willis | 359/238 |
| 2008/0192112 A1 * | 8/2008 | Hiramatsu et al. | 348/51 |

FOREIGN PATENT DOCUMENTS

| | | |
|---|---|---|
| JP | 2001-043393 | 2/2001 |
| JP | 2008-304202 | 12/2008 |
| KR | 10-2005-0031467 | 4/2005 |
| KR | 20-2005-0075807 | 7/2005 |
| KR | 10-2007-0061030 | 6/2007 |
| KR | 10-074820 | 8/2007 |
| KR | 10-2008-0018405 | 2/2008 |

OTHER PUBLICATIONS

Stephen J. Adelson, Larry F. Hodges, "Stereoscopic ray-tracing", The Visual Computer, vol. 10, No. 3, Dec. 1993,p. 127-144.*
Christoph Fehn ("Depth-Image-Based Rendering (DIBR), Compression and Transmission for a New Approach on 3D-TV", Proc. of SPIE-IS&T Electronic Imaging, SPIE vol. 5291, 2004, p. 93-104.*

* cited by examiner

*Primary Examiner* — Ke Xiao
*Assistant Examiner* — Weiming He
(74) *Attorney, Agent, or Firm* — Staas & Halsey LLP

(57) ABSTRACT

Provided is an image processing apparatus and method that may perform rendering based on a plurality of viewpoints to generate a stereoscopic image. Through this, it is possible to decrease a calculation amount.

16 Claims, 14 Drawing Sheets

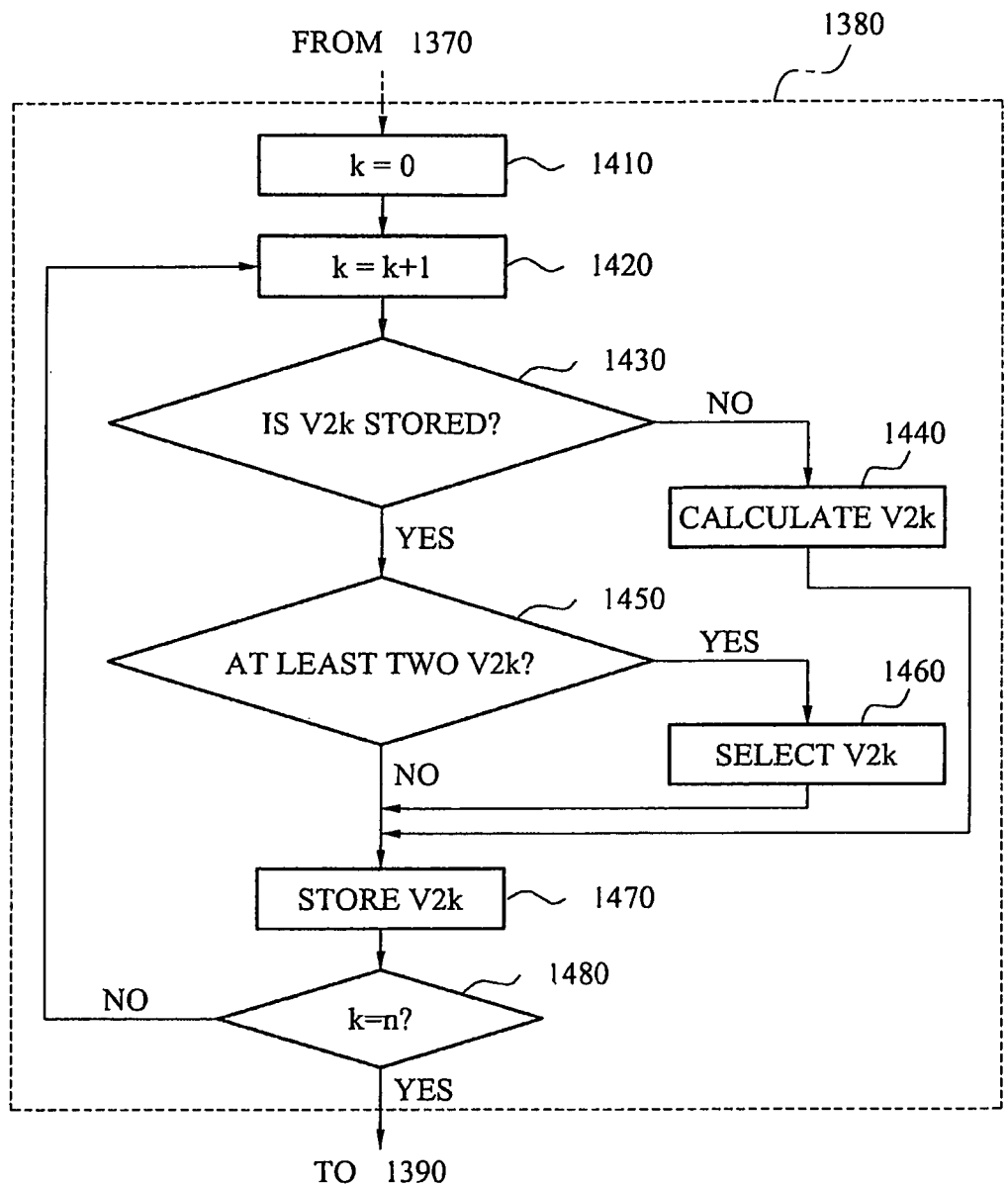

IMAGE PROCESSING APPARATUS PERFORMING RENDERING USING MULTIPLE VIEWPOINTS AND METHOD

CROSS-REFERENCE TO RELATED APPLICATION

This application claims the benefit of Korean Patent Application No. 10-2009-0066251, filed on Jul. 21, 2009, in the Korean Intellectual Property Office, the disclosure of which is incorporated herein by reference.

BACKGROUND

1. Field

One or more embodiments relate to an image processing apparatus and method that may render an object constituting a three-dimensional (3D) model based on a plurality of viewpoints to generate a stereoscopic image.

2. Description of the Related Art

Currently, many people are increasingly interested in three-dimensional (3D) display devices and 3D images. For example, among 3D image generation schemes, a scheme of generating a stereoscopic image is receiving much attention.

Since a location of a left eye and a location of a right eye are different from each other, an observer may feel disparity between the views and thereby feel a different perspective with respect to an object.

The stereoscopic image generation scheme may realize a 3D display by providing two different images that are rendered at two different viewpoints with respect to the same 3D model. Here, one image may be provided for the left eye and the other image may be provided for the right eye.

A 3D rendering process indicates an image process to generate an image at a particular viewpoint based on information associated with a modeled virtual 3D object, and to provide the generated image. The 3D rendering process may be performed using, for example, a polygon-based rasterization scheme, a ray tracing scheme of tracking a ray progress path from a viewpoint to be rendered, etc.

Since the ray tracing scheme uses physical properties such as a reflection, a refraction, and a transmittance of light, the ray tracing scheme may generate a high quality image that is similar to a real picture. However, since a great amount of calculation is required, it is difficult to perform real-time rendering. In addition, the ray tracing scheme may need high performance hardware.

As described above, a high quality stereoscopic image may be generated using the ray tracing scheme of the 3D rendering process. However, to perform rendering at different viewpoints may require twice as many calculations as a number of calculations as when rendering is performed at a single viewpoint. Accordingly, there is a need for an image processing apparatus and method that may reduce a calculation amount when performing rendering at different viewpoints.

SUMMARY

One or more embodiments may provide an image processing apparatus and method that may reduce a calculation amount used in rendering, while maintaining a quality of a stereoscopic image.

One or more embodiments may provide an image processing apparatus and method that may enhance a real-time rendering probability by reducing a calculation amount when performing a ray tracing at two or more viewpoints.

Additional aspects, features, and/or advantages of exemplary embodiments will be set forth in part in the description which follows and, in part, will be apparent from the description, or may be learned by practice of the disclosure.

The foregoing and/or other aspects are achieved by providing an image processing apparatus including a first calculator to render a first image observed at a first viewpoint with respect to a three-dimensional (3D) model that includes at least one object, and a second calculator to render a second image observed at a second viewpoint with respect to the 3D model by reusing a pixel value of the first image associated with a first object of the at least one object when a distance between the first object and a first point in relation to the image processing apparatus is greater than or equal to a first threshold.

The first point may correspond to the first viewpoint.

The second calculator may reuse the pixel value of the first image associated with the first object for which the distance from the first point is greater than or equal to the first threshold as a pixel value of the second image.

When a distance between a second object of the at least one object and the first point is greater than or equal to a second threshold and is less than the first threshold, the second calculator may shift the pixel value of the first image associated with the second object to reuse the shifted pixel value of the first image to render the second image.

A level of the shifting may be in inverse proportion to the distance between the second object and the first point.

The image processing apparatus may further include an image synthesizer to generate a stereoscopic image by synthesizing the first image and the second image.

The rendering of the first and second images may be performed using a ray tracing scheme.

The distance between the first object and the first viewpoint may be determined based on a coordinate value of at least one mesh among meshes included in the first object and a coordinate value of the first viewpoint.

The foregoing and/or other aspects are achieved by providing an image processing apparatus, including a first calculator to calculate a pixel value of a first pixel of a first image, the first image being rendered at a first viewpoint with respect to a 3D model that includes at least one object, and a second calculator to calculate a pixel value of a second pixel of a second image using the pixel value of the first pixel when a distance between a first object corresponding to the first pixel and a first point in relation to the image processing apparatus is greater than or equal to a first threshold, the second pixel having the same index as the first pixel, the second image being rendered at a second viewpoint with respect to the 3D model.

The first point may correspond to the first viewpoint.

The second calculator may calculate the pixel value of the second pixel to be the same as the pixel value of the first pixel.

When the distance between the first object corresponding to the first pixel and the first point is greater than or equal to a second threshold and is less than the first threshold, the second calculator may use the pixel value of the first pixel to calculate a pixel value of a third pixel at a shifted location of the first pixel in the second image.

A level of the shifting may be in inverse proportion to the distance between the first object and the first point.

The foregoing and/or other aspects are achieved by providing an image processing method including rendering a first image observed at a first viewpoint with respect to a 3D model that includes at least one object at an image processing apparatus, and rendering a second image observed at a second viewpoint with respect to the 3D model by reusing a pixel value of the first image associated with a first object of the at least one object when a distance between the first object and a first point in relation to the image processing apparatus is greater than or equal to a first threshold at the image processing apparatus.

The rendering of the second image by reusing the pixel value of the first image may include reusing the pixel value of the first image associated with the first object for which the distance of the first object from the first point is greater than or equal to the first threshold as a pixel value of the second image.

17. The image processing method of claim 11, further comprising shifting the pixel value of the first image associated with a second object of the at least one object to render the second image observed at the second viewpoint with respect to the 3D image when a distance between the second object and the first point is greater than or equal to a second threshold and is less than the first threshold.

The image processing method may include shifting the pixel value of the first image associated with a second object of the at least one object to render the second image observed at the second viewpoint with respect to the 3D image when a distance between the second object and the first point is greater than or equal to a second threshold and is less than the first threshold.

The image processing method may further include generating a stereoscopic image by synthesizing the first image and the second image.

BRIEF DESCRIPTION OF THE DRAWINGS

These and/or other aspects will become apparent and more readily appreciated from the following description of the exemplary embodiments, taken in conjunction with the accompanying drawings of which:

FIG. 14 illustrates a detailed process of performing rendering of FIG. 13.

DETAILED DESCRIPTION

Figure 1:
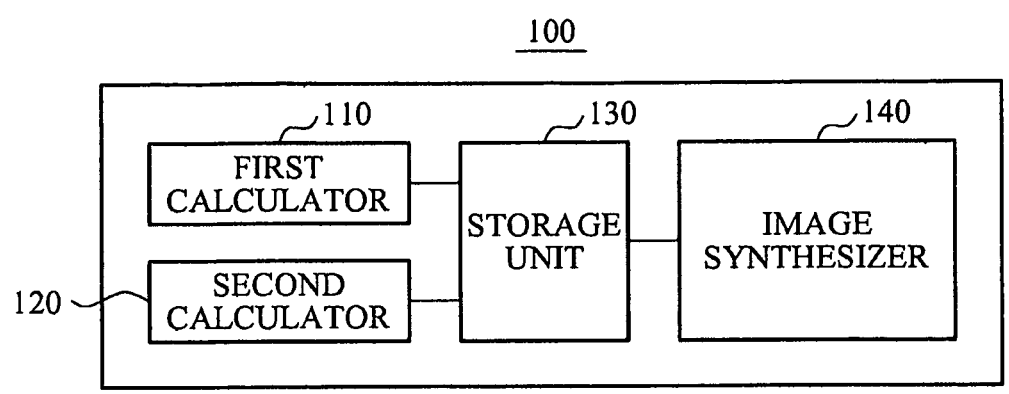
FIG. 1 illustrates a block diagram of an image processing apparatus according to an embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates a block diagram of an image processing apparatus 100 according to an embodiment.

The image processing apparatus 100 may include a first calculator 110 to render a first image observed at a first viewpoint with respect to a three-dimensional (3D) image, and a second calculator 120 to render a second image observed at a second viewpoint with respect to the 3D image.

The rendering process may be performed using a ray tracing scheme. However, the ray tracing scheme is only an example. Therefore, in addition to the ray tracing scheme, any type of 3D image rendering schemes may be used.

The rendering process indicates a process of generating a two-dimensional (2D) image observed at a particular viewpoint with respect to the 3D model, that is, a process of calculating a pixel value of each of pixels constituting the 2D image. However, the 2D image may two dimensionally express a rendered image. Therefore, it may be impossible to express a 3D effect of appearing as though the object protrudes from a screen, using a single 2D image.

A stereoscopic image generation scheme may provide a left eye of an observer with a 2D image (hereinafter, a first image) that is rendered at a first viewpoint with respect to a 3D model, and provide a right eye of the observer with another 2D image (hereinafter, a second image) that is rendered at a second viewpoint that is different from the first viewpoint with respect to the 3D model.

An existing commercialized scheme may generate the two 2D images using different colors and then synthesize the two 2D images into a single image and provide the synthesized image. In this case, among the two 2D images, a first image may be recognized when the observer views the images using a blue lens. A second image may be recognized when the observer views the images using a red lens.

According to a conventional art, a process of rendering the first image at the first viewpoint with respect to the 3D model and a process of rendering the second image at the second viewpoint with respect to the 3D model may be separately performed. Accordingly, calculation values used for any one rendering process may not be used for the other rendering process.

According to the conventional art, a rendering calculation amount of the first image and a rendering calculation amount of the second image may not decrease. Accordingly, when the process of rendering the first image and the process of rendering the second image are performed in series, a rendering calculation amount may become at most doubled in comparison to a rendering calculation amount of a single image.

In particular, in the case of a scheme using a great amount of calculations for rendering such as the ray tracking scheme, it generally takes a relatively longer calculation time and thus it is difficult to perform real-time rendering.

According to an embodiment, at least one portion of rendering result values of a first image observed at a first viewpoint may be reused to render the second image observed at a second viewpoint.

Since the second calculator 120 used to render the second image may reuse a calculation result of the first calculator 110 used to render the first image, a calculation time may decrease.

Calculation values of the first calculator 110, for example, at least one pixel value of the first image, and/or calculation values of the second calculator, for example, at least one pixel value of the second image, may be stored in a storage unit 130. An image synthesizer 140 may generate the stereoscopic image using the stored calculation values.

Examples of using at least one of rendering calculation results of the first calculator 110 for a rendering calculation of the second calculator 120 will be further described with reference to FIG. 2.

Figure 2:
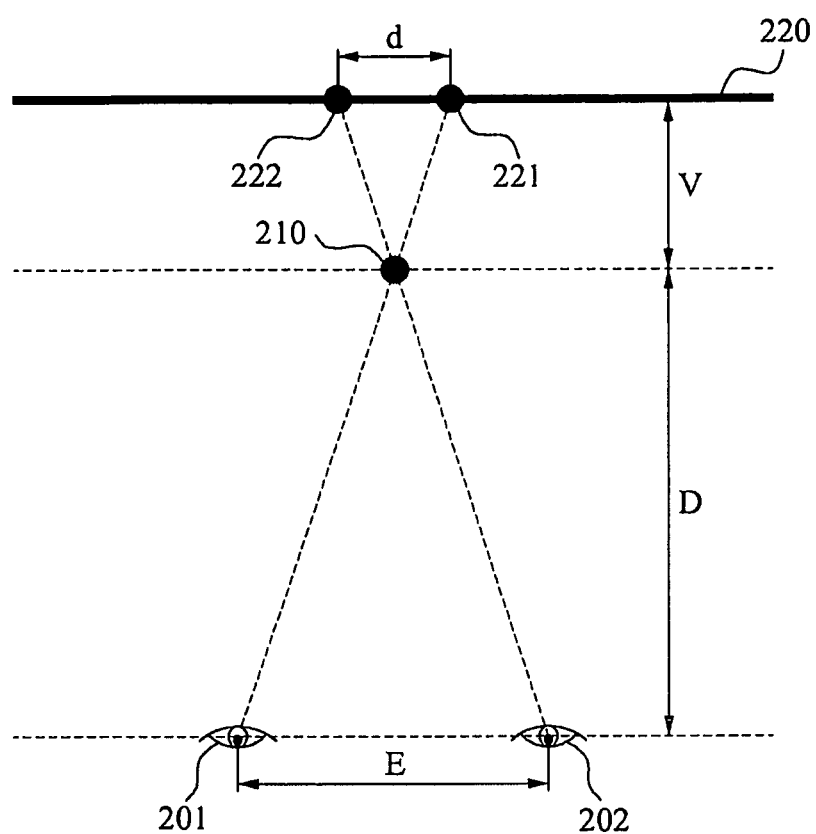
FIG. 2 illustrates a diagram describing a disparity occurring due to a difference between viewpoints according to an embodiment.

FIG. 2 illustrates a diagram describing a disparity occurring due to a difference between viewpoints according to an embodiment.

Where a left eye 201 and a right eye 202 of an observer gaze at a particular point 210 on a 3D space, the left eye 201 may recognize that the point 210 is located at a first location point 221 on a virtual screen 220 and the right eye 202 may recognize that the point 210 is located at a second location point 222 on the virtual screen 220.

In this case, a distance d between the two location points 221 and 222 may correspond to a disparity.

The disparity d may be calculated according to the following Equation 1:

$$d = \frac{E \times V}{D} \qquad \text{[Equation 1]}$$

Here, E denotes a constant distance between the left eye 201 and the right eye 202, D denotes a distance between the left eye 201 and the right eye 202, and the point 210, and V denotes a distance between the point 210 and the virtual screen 220.

As D increases in comparison to V, for example, as a point is located further away from the eyes, the disparity d may have a smaller value. Conversely, as D decreases in comparison to V, for example, as a point is located nearer to the eyes, the disparity d may have a greater value.

Accordingly, pixel values of the two location points 221 and 222 of the same point 210 that are expressed on the virtual screen 220 may be nearly the same as each other.

Theoretically, when a value of V/D is less than or equal to a predetermined threshold, for example, when D is greater than or equal to a predetermined threshold, the disparity d may be an insignificant value able to be ignored.

According to an embodiment, a pixel value of a point observed at any one viewpoint between the left eye 201 and the right eye 202, for example, a pixel value of the first location point 221 observed at the left eye 201 may be used as a pixel value of the second location point 222 observed from the other viewpoint, for example, the right eye 202.

Accordingly, when a pixel value corresponding to the first location point 221 of a first image rendered at a first viewpoint with respect to the point 210 is calculated, the calculated pixel value may be shifted by d and thereby be reused as a pixel value corresponding to the second location point 222 of a second image rendered at a second viewpoint with respect to the point 210.

When D is greater than or equal to a predetermined threshold and thus is an insignificant value able to be ignored, the above shifting process may be omitted.

The above case of D being greater than or equal to a predetermined threshold will be further described with reference to FIG. 3.

Figure 3:
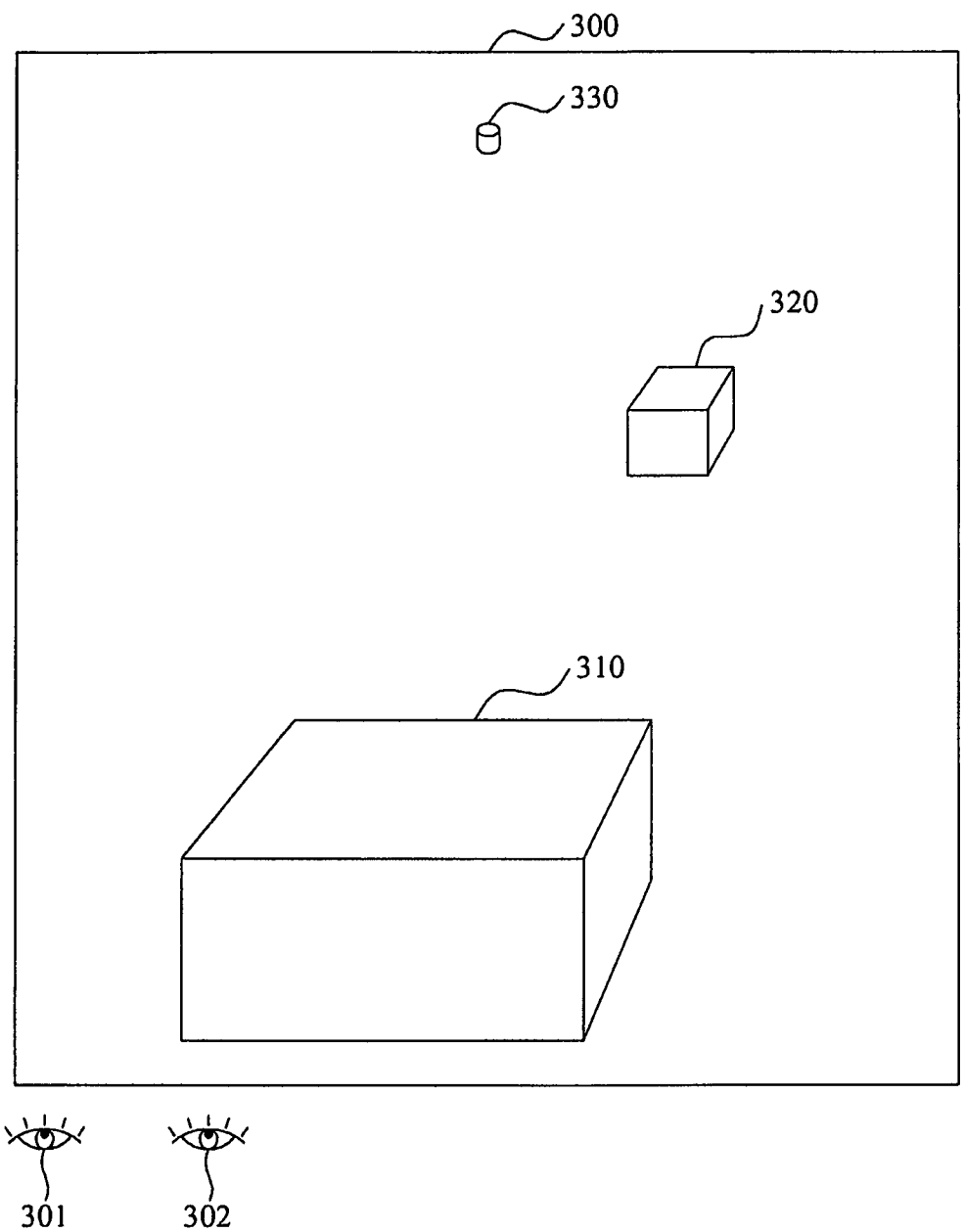
FIG. 3 illustrates a three-dimensional (3D) object to be rendered according to an embodiment.

FIG. 3 illustrates a 3D object to be rendered according to an embodiment.

As rendering targets, a short-distance object 310, a mid-distance object 320, and a long-distance object 330 with respect to a first viewpoint 301 and a second viewpoint 302 may exist within a 3D modeled space 300.

It can be intuitively known that an image of the short-distance object 310 observed at the first viewpoint 301 and an image of the short-distance object 310 observed at the second viewpoint 302 may be significantly different.

However, in the case of the mid-distance object 320, a difference between an image of the mid-distance object 320 observed at the first viewpoint 301 and an image of the mid-distance object 320 observed at the second viewpoint 302 may not be as great as the difference for the short-distance object 310. Only a location may look slightly different at the first viewpoint 301 and the second viewpoint 302.

In the case of the long-distance object 330, a difference between an image of the long-distance object 330 observed at the first viewpoint 301 and an image of the long-distance object observed at the second viewpoint 302 barely exists. Depending on embodiments, even when the images observed at the first and second viewpoints are regarded as the same, a great error may not occur.

According to an embodiment, among pixel values of a first image rendered at the first viewpoint 301 with respect to a 3D model, a pixel value corresponding to the long-distance object 330 may be used as a pixel value of the same location of a second image that is rendered at the second viewpoint 302 with respect to the 3D image. Accordingly, it is possible to reduce a calculation amount.

Among pixel values of the first image, a pixel value corresponding to the mid-distance object 320 may be shifted to any one direction, for example, to the left by a predetermined level that is in inverse proportion to a corresponding distance, and thereby be used to calculate the pixel value of the second image. Accordingly, it is possible to further reduce a calculation amount.

When it is impossible to reduce a calculation amount using the above scheme, for example, when it is impossible to use the pixel value of the first image for a corresponding pixel value of the second image, the corresponding pixel value may be recalculated.

Figure 4:
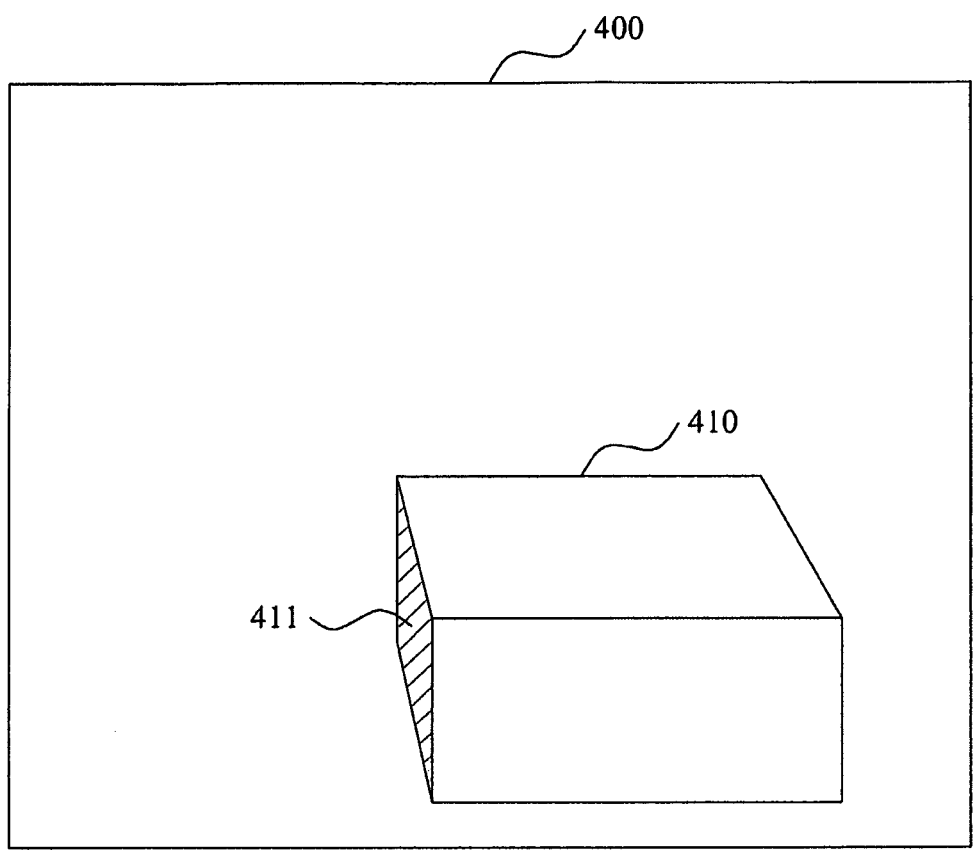
FIG. 4 illustrates an image rendered at a first viewpoint with respect to a short-distance object of FIG. 3, according to an embodiment.

FIG. 4 illustrates an image 400 rendered at the first viewpoint 301 with respect to the short-distance object 310 of FIG. 3, according to an embodiment.

A region 410 indicates a rendered portion of the short-distance object 310. In this case, it can be seen that a left side of the short-distance object 310 is rendered into a shaded region 411.

Figure 5:
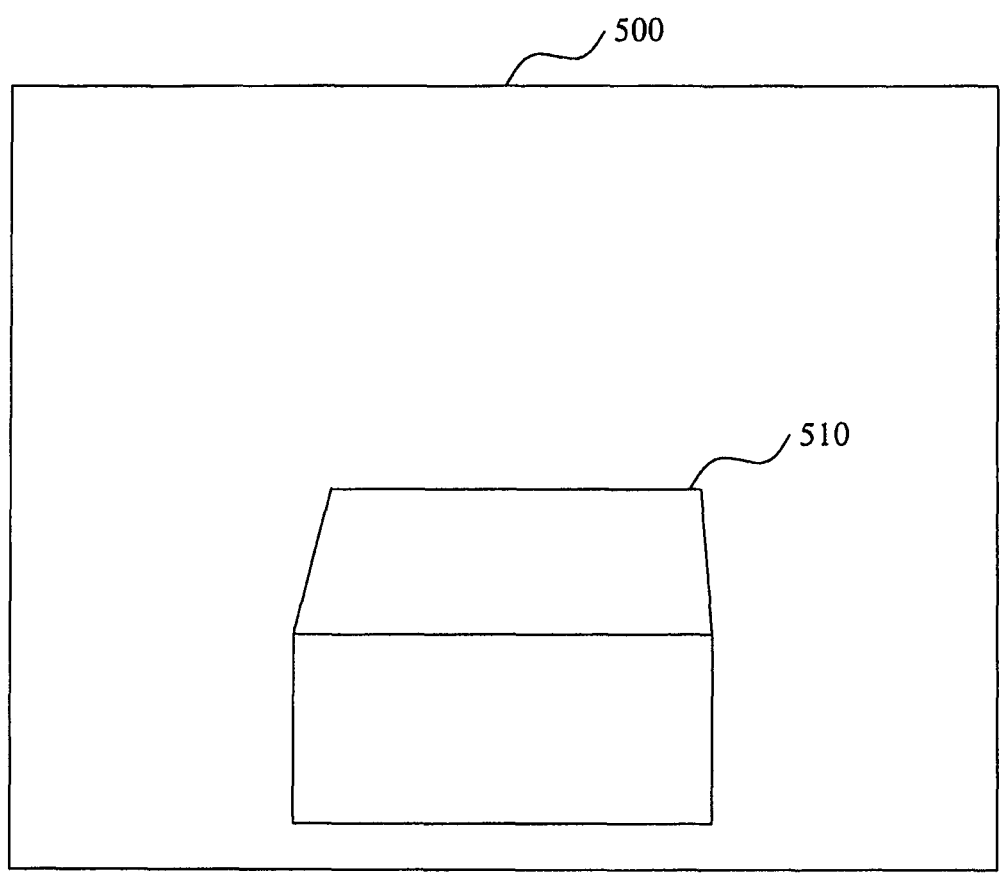
FIG. 5 illustrates an image rendered at a second viewpoint with respect to the rendered short-distance object of FIG. 4, according to an embodiment.

FIG. 5 illustrates an image 500 rendered at the second viewpoint 302 with respect to the rendered short-distance image 310 of FIG. 4, according to an embodiment.

As shown in FIG. 3, the left side of the short-distance object 310 is unseen at the second viewpoint 302. Accordingly, the shaded region 411 of FIG. 4 does not appear in a rendered portion 510 of the short-distance object 310.

As shown in FIGS. 4 and 5, a great difference may exist between the image rendered at the first viewpoint 301 and the image rendered at the second viewpoint 302. Accordingly, a rendering calculation result of any one side may not be used for a calculation of the other side.

Figure 6:
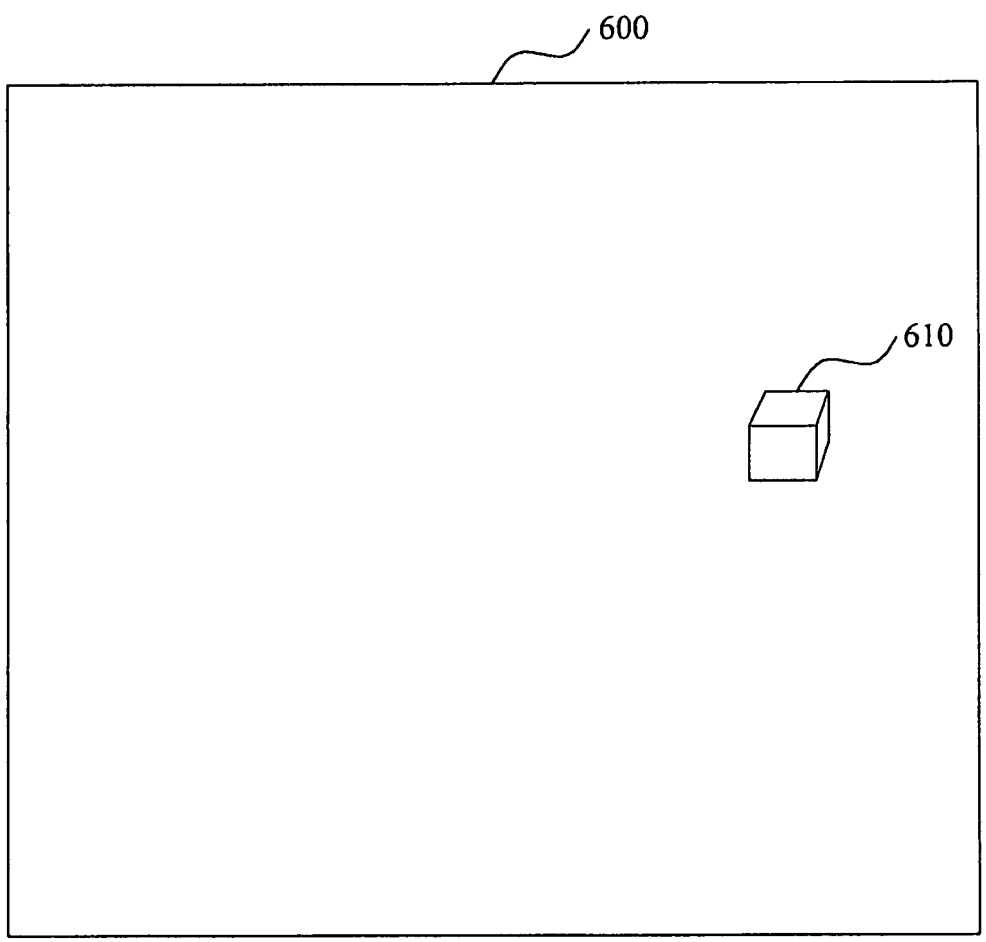
FIG. 6 illustrates an image rendered at a first viewpoint with respect to a mid-distance object of FIG. 3 according to an embodiment.

FIG. 6 illustrates an image 600 rendered at the first viewpoint 301 with respect to the mid-distance object 320 of FIG. 3 according to an embodiment.

In the image 600, the mid-distance object 320 is being rendered in a region 610.

Unlike the short-distance object 310, in the case of the mid-distance object 320, a difference between an image of the mid-distance object 320 observed at the first viewpoint 301 and an image of the mid-distance object 320 observed at the second viewpoint 302 barely exists. For example, when the mid-distance object 320 is observed at each of the first viewpoint 310 and the second viewpoint 320, a location difference may exist, whereas a shape difference may barely exist.

Accordingly, a pixel value of the region 610 rendered at the first viewpoint 301 with respect to the mid-distance object 320 may be shifted to the left by a predetermined level and thereby be used to render an image at the second viewpoint 302.

Figure 7:
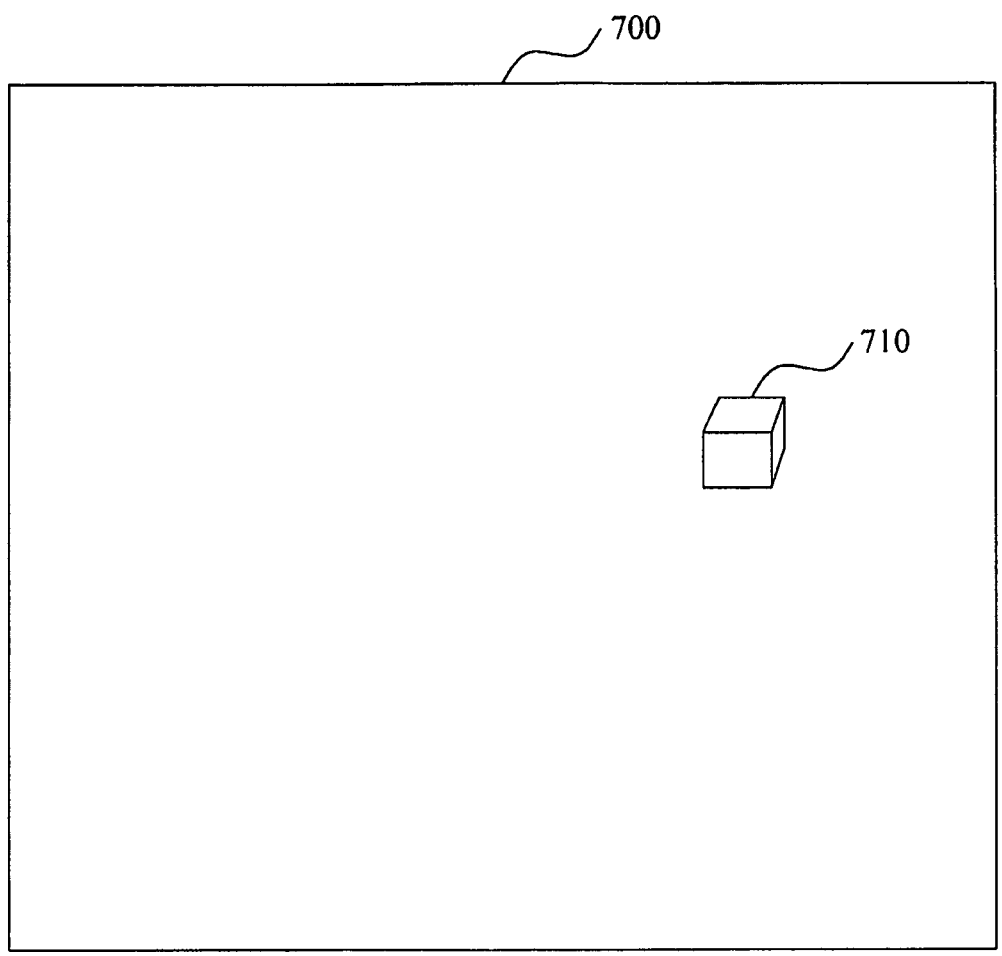
FIG. 7 illustrates an image at a second viewpoint generated by shifting a rendered region of FIG. 6, according to an embodiment.

FIG. 7 illustrates an image 700 at the second viewpoint 302 generated by shifting the region 610 of FIG. 6, according to an embodiment.

The region 610 rendered at the first viewpoint 301 may be shifted to the left by a predetermined level and thereby be used as a pixel value of a region 710 of a second image rendered at the second viewpoint 302.

Accordingly, it is possible to save resources corresponding to rendering of pixel values of pixels constituting the region 710.

Figure 8:
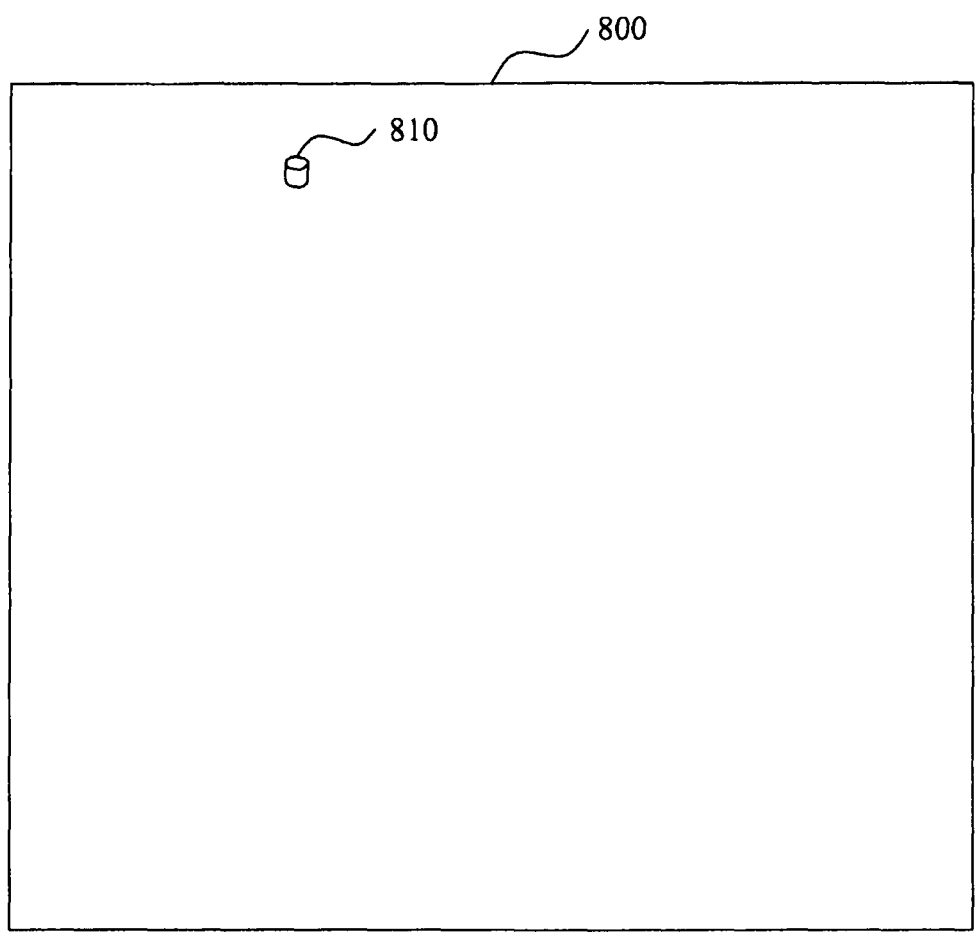
FIG. 8 illustrates an image rendered at a first viewpoint with respect to a long-distance object of FIG. 3 according to an embodiment.

FIG. 8 illustrates an image 800 rendered at the first viewpoint 301 with respect to the long-distance object 330 of FIG. 3 according to an embodiment.

The long-distance object 330 is rendered in a region 810 of the image 800.

The long-distance object 330 is located away from the first viewpoint 301. Therefore, even when the long-distance object 330 is rendered at the second viewpoint 302, a location or a shape of the rendered long-distance object 330 may be nearly the same as a location or a shape of the region 810. Accordingly, the calculated value may be used as is.

Figure 9:
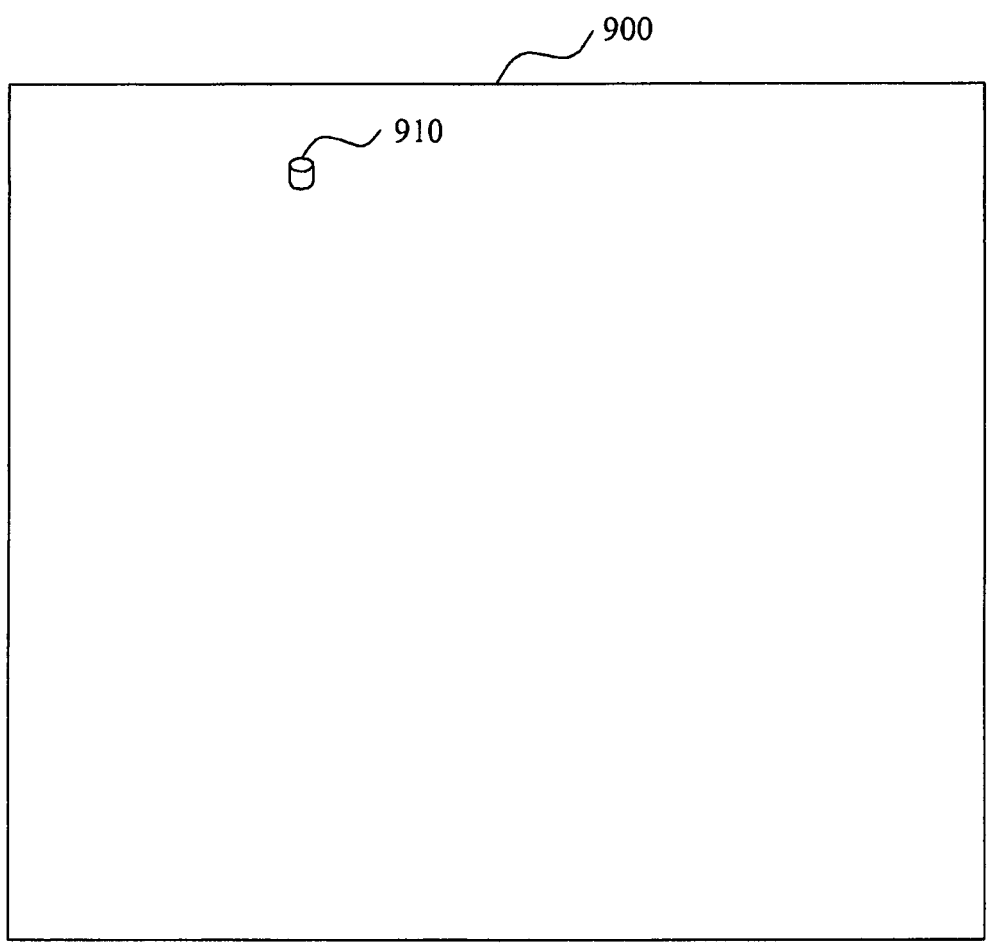
FIG. 9 illustrates an image at a second viewpoint generated by copying the rendered image of FIG. 8, according to an embodiment.

FIG. 9 illustrates an image 900 at the second viewpoint 302 generated by copying the region 810 of FIG. 8, according to an embodiment.

A pixel value of a region 910 may be determined by copying the region 810 of the first image, rendered at the first viewpoint 301, to the same location as the second image rendered at the second viewpoint 302.

Accordingly, it is possible to save resources used to calculate the region 910.

The long-distance object 330 may be determined as an object of which a distance from a particular point, for example, the first viewpoint 301 is greater than or equal to a first threshold. The mid-distance object 320 may be determined as an object of which a distance from the particular point is greater than or equal to a second threshold and is less than the first threshold.

The distance may be determined based on a 3D coordinate value of the particular point and a 3D coordinate value of at least one mesh among a plurality of meshes constituting an object.

When the rendering process uses a ray tracing scheme, a distance between a viewpoint and a collision point of a primary ray may be used.

Figure 10:
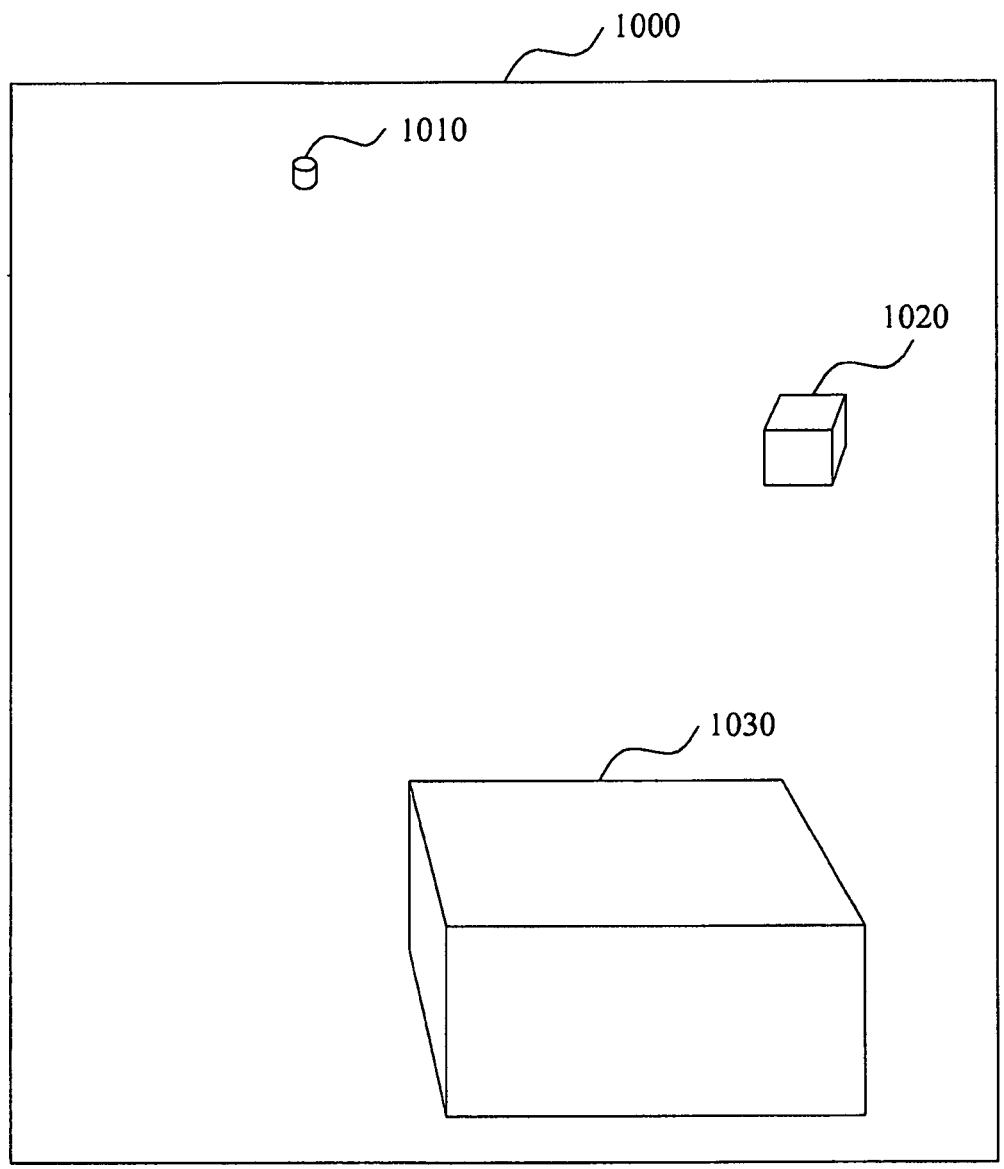
FIG. 10 illustrates an image rendered at a first viewpoint according to an embodiment.

FIG. 10 illustrates an image 1000 rendered at the first viewpoint 301 of FIG. 3 according to an embodiment.

Referring to FIG. 10, a region 1030 corresponds to the region 410 of FIG. 4, a region 1020 corresponds to the region 610 of FIG. 6, and a region 1010 corresponds to the region 810 of FIG. 8.

Figure 11:
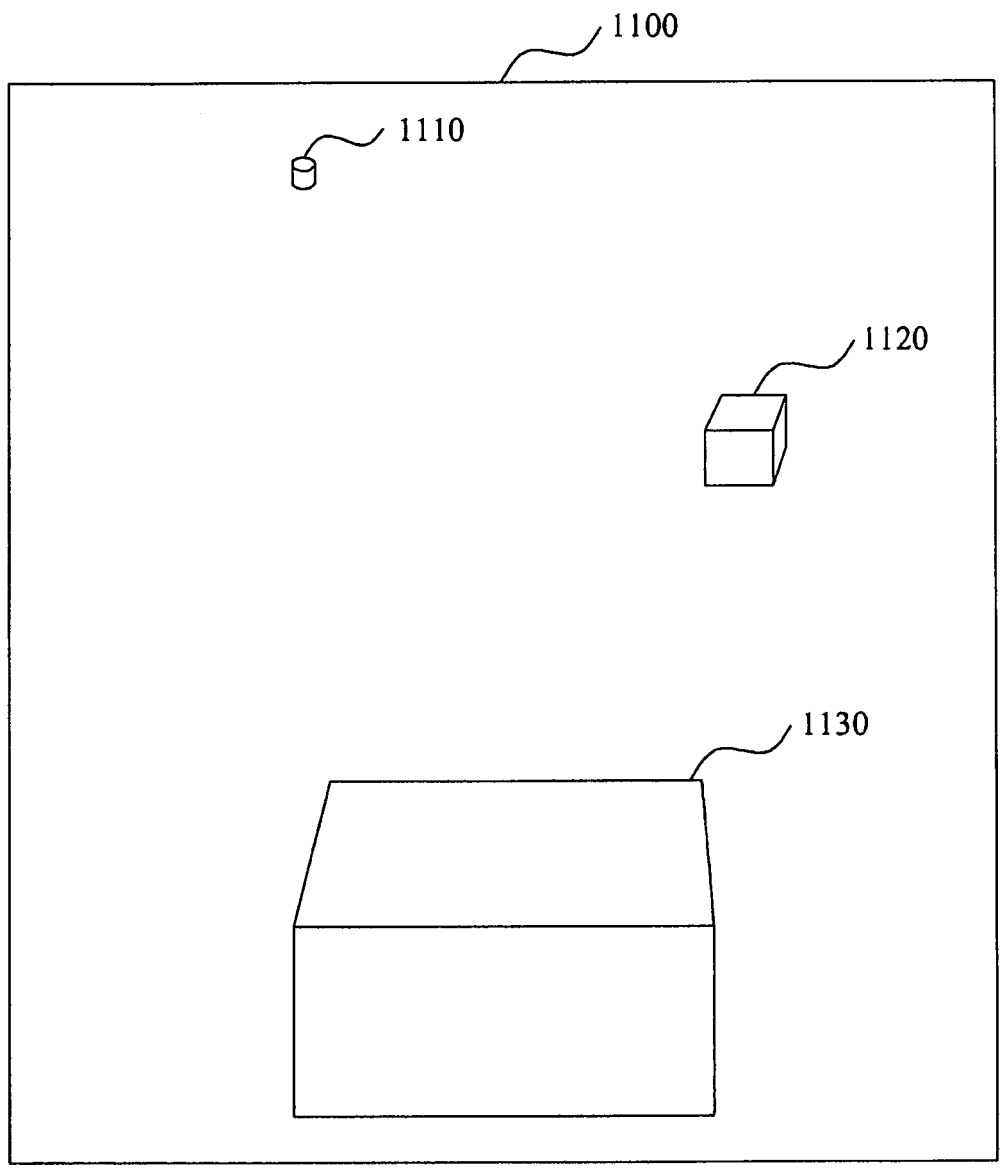
FIG. 11 illustrates an image rendered at a second viewpoint obtained by using the rendered image of FIG. 10 according to an embodiment.

FIG. 11 illustrates an image 1100 rendered at a second viewpoint obtained by using a portion of the rendered image of FIG. 10, for example, the regions 1010 and 1020 according to an embodiment.

As described above with reference to FIG. 7, a region 1120 corresponding to a mid-distance object may be obtained without a separate calculation by shifting a pixel value of the region 1020 of the image 1000 that is rendered at the first viewpoint, and by using the shifted pixel value.

As described above with reference to FIG. 9, a region 1110 corresponding to a long-distance object may be obtained without a separate calculation by copying a pixel value of the region 1010 of the image 1000 that is rendered at the first viewpoint, and by using the copied pixel value.

In the case of a region 1130 corresponding to a short-distance object, for example, a remaining portion of the image 1100 rendered at the second viewpoint, a pixel value of the region 1130 may not use a value used for the image 1000 and thus may be calculated through an actual rendering process.

According to an embodiment, it is possible to significantly decrease a calculation amount used for rendering two 2D images to synthesize the 2D images into a stereoscopic image.

Figure 12:
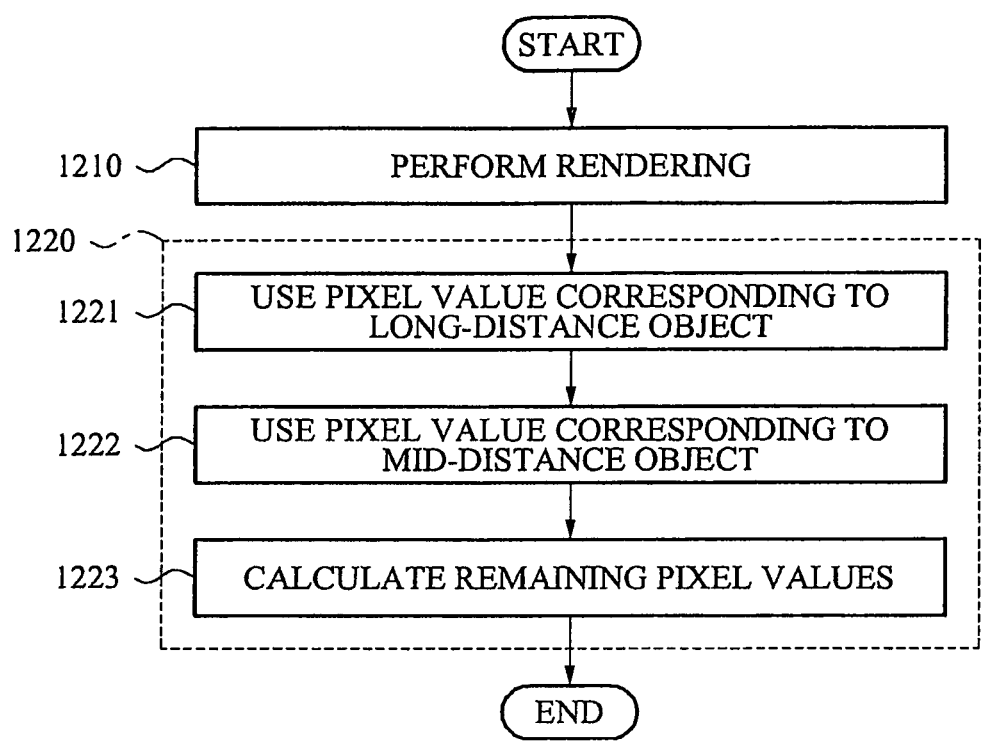
FIG. 12 illustrates a flowchart of an image processing method according to an embodiment.

FIG. 12 illustrates a flowchart of an image processing method according to an embodiment.

In operation 1210, a rendering process may be performed at a first viewpoint to generate a first viewpoint image.

The rendering process may be performed using a general rendering scheme, for example, a ray tracing scheme.

In operation 1220, a second viewpoint image may be generated.

Specifically, in operation 1221, a pixel value corresponding to a long-distance object among pixels constituting the first viewpoint image may be determined as a pixel value of the same location within the second viewpoint image.

In operation 1222, a pixel value corresponding to a mid-distance object among the pixels constituting the first viewpoint image may be determined as a pixel value of the location allocated that is shifted within the second viewpoint image by a predetermined level.

The level of shifting may vary depending on how far away a corresponding object is located, and may also be in inverse proportion to a distance between the first viewpoint and the corresponding object.

When a location of the pixel value corresponding to the mid-distance object is shifted from the first image to the second image, the shifted value may overwrite a pixel of which a pixel value is calculated in operation 1221.

In this case, a rendering result of a relatively shorter-distance object from a viewpoint may take precedence. This is because the relatively shorter-distance object from the viewpoint occludes a relatively longer-distance from the viewpoint and looks natural to human eyes.

In operation 1223, values of remaining pixels of the second viewpoint image of which pixel values are not calculated during the above process may be calculated.

Even in this case, the above process may be performed using the general rendering scheme.

Figure 13:
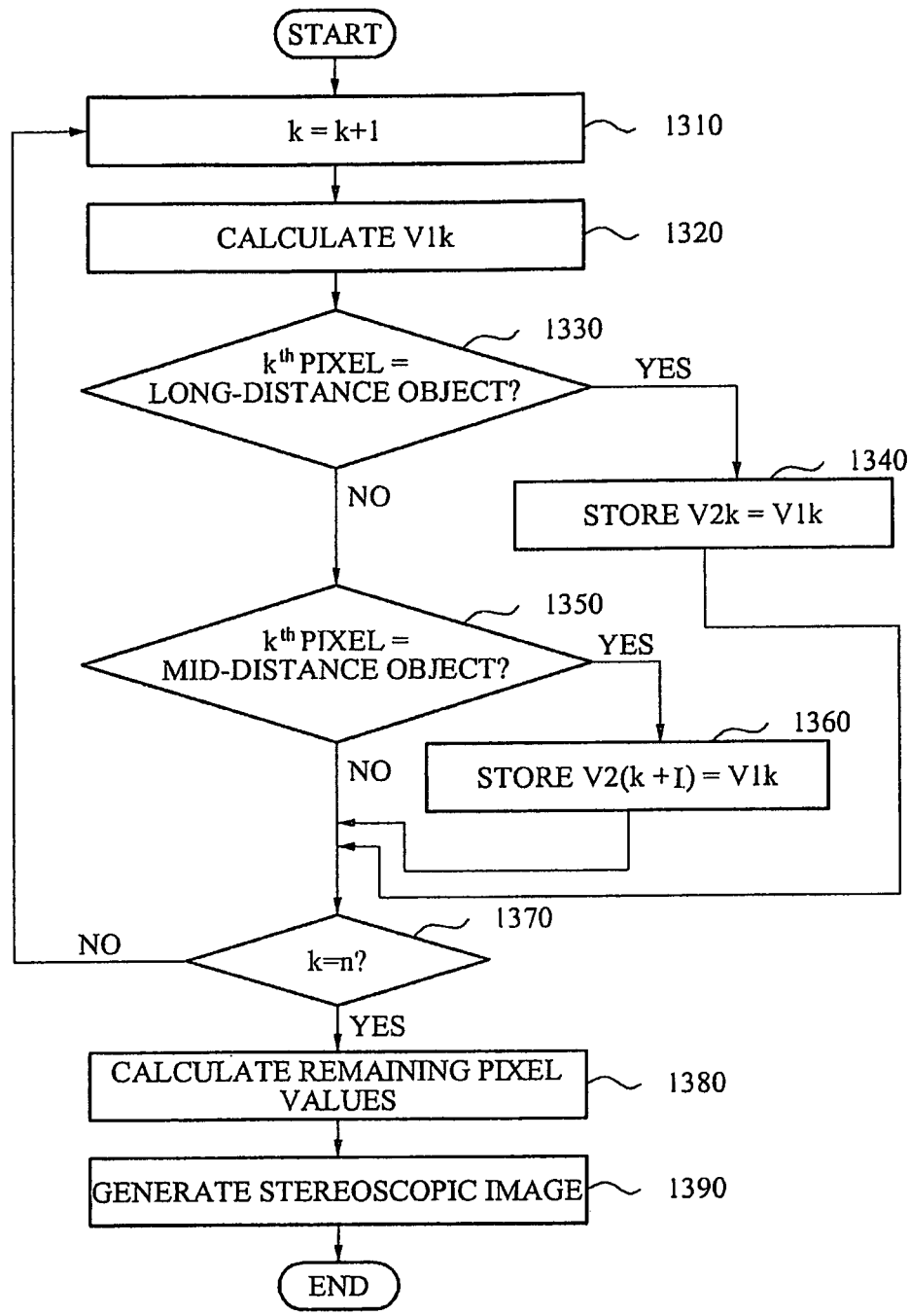
FIG. 13 illustrates a flowchart of an image processing method according to another embodiment.

FIG. 13 illustrates a flowchart of an image processing method according to another embodiment.

Here, zero is given for an initial value of integer k.

When a loop starts, 1 may be added to k in operation 1310.

In operation 1320, V1k that is a k$^{th}$ pixel value of a first viewpoint image may be calculated.

The calculation may be performed using a general rendering scheme, and may also be performed using a ray tracing scheme.

In operation 1330, it may be determined whether a k$^{th}$ pixel corresponds to a long-distance object, for example, an object of which a distance from a first viewpoint is greater than or equal to a first threshold. Here, operations 1320 and 1330 may be simultaneously or sequentially performed.

When the k$^{th}$ pixel is determined as the long-distance object, the k$^{th}$ pixel value V1k of the first viewpoint image may be stored as a pixel value V2k of the same location within a second viewpoint image in operation 1340.

Conversely, when the k$^{th}$ pixel is not determined as the long-distance object, it may be determined whether the k$^{th}$ pixel corresponds to a mid-distance object, for example, an object of which a distance from the first viewpoint is greater than or equal to a second threshold and is less than the first threshold in operation 1350.

When the k$^{th}$ pixel is determined as the mid-distance object, a location of the first pixel within the second viewpoint image may be stored as a (k+I)$^{th}$ pixel value of a location that is shifted by index "I" in operation 1360.

A level of the shifting, that is, the index "I" denotes an integer and may become smaller as the corresponding object is located farther away from the viewpoint. The level may be a positive integer or a negative integer depending on a location of each of the first viewpoint and the second viewpoint.

When the corresponding object is determined to be neither the long-distance object nor the mid-distance object, it may be determined whether the k$^{th}$ pixel is n, that is, a last pixel in operation 1370. Here, n denotes a total number of pixels constituting the first viewpoint image to be rendered.

When the k$^{th}$ pixel is not the last pixel, operations 1310 through 1360 may be repeated whereby the loop may be circulated.

Conversely, when the k$^{th}$ pixel is the last pixel whereby an escape condition of the loop is satisfied, rendering may be performed for only a remaining pixel of which a pixel value is not calculated during the above process among pixels constituting a second viewpoint image in operation 1380. The above case of rendering being performed for only the remaining pixel will be further described with reference to FIG. 14.

Since a great portion of a calculation to render the second viewpoint image is omitted in the above process, resources for the calculation may be saved.

When the first viewpoint image and the second viewpoint are completed, a stereoscopic image may be generated by synthesizing the first viewpoint image and the second viewpoint image in operation 1390.

FIG. 14 illustrates a detailed process of operation 1380 of FIG. 13.

When the escape condition of the loop is satisfied in operation 1370, that is, when all the pixel values of the first viewpoint image are calculated, k=0 is given as an initial value of a second loop in operation 1410.

In operation 1420, "1" may be added to k. In operation 1430, it may be determined whether the k$^{th}$ pixel value V2k of the second viewpoint image is determined and is stored during the previous process.

When the k$^{th}$ pixel is not stored, the k$^{th}$ pixel value V2k of the second viewpoint image may be calculated using a general rendering scheme in operation 1440.

Conversely, when the k$^{th}$ pixel is stored, it may be determined whether at least two V2k may exist in operation 1450. Operation 1450 may be omitted in an embodiment having a policy of storing only a single pixel value corresponding to a relatively short-distance object when a plurality of values is stored with respect to the same pixel during the previous process.

When the at least two V2k are stored, a pixel value corresponding to the relatively short-distance object may be determined as a final V2k in operation 1460.

In operation 1470, V2k may be stored. Operations 1420 through 1470 may be repeated until the escape condition of the second loop, that is, k=n is satisfied in operation 1480.

The image processing method according to the above-described exemplary embodiments may be recorded in computer-readable media including program instructions to cause a computer to implement various operations. The media may also include, alone or in combination with the program instructions, data files, data structures, and the like. Examples of computer-readable media include magnetic media, such as hard disks, floppy disks, and magnetic tape; optical media, such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An image processing apparatus, comprising:
   a first calculator, using a processor, to render a first image observed at a first viewpoint with respect to a three-dimensional (3D) model that includes at least one object; and
   a second calculator to render a second image observed at a second viewpoint with respect to the 3D model by assigning a pixel value of the first image associated with a first object within the 3D model as a pixel value of the second image, when a distance between the first object and a first point is greater than or equal to a first predetermined threshold,
   wherein, when the distance between the first object and the first point is less than the first predetermined threshold, the second calculator renders the second image observed at the second viewpoint by shifting the pixel value of the first image associated with the first object by a predetermined level and assigning the shifted pixel value of the first image associated with the first object as a pixel value of the second image,
   wherein the first point corresponds to a point between the first viewpoint and the second viewpoint.

2. The image processing apparatus of claim 1, wherein the second calculator shifts the pixel value of the first image associated with a second object to reuse the shifted pixel value of the first image to render the second image when a distance between the second object and the first point is greater than or equal to a second predetermined threshold and is less than the first predetermined threshold.

3. The image processing apparatus of claim 2, wherein a level of the shifting is in inverse proportion to the distance between the second object and the first point.

4. The image processing apparatus of claim 1, further comprising an image synthesizer generating a stereoscopic image by synthesizing the first image and the second image.

5. The image processing apparatus of claim 1, wherein the rendering of the first and second images is performed using a ray tracing scheme.

6. The image processing apparatus of claim 1, wherein the distance between the first object and the first viewpoint is determined based on a coordinate value of at least one mesh among meshes included in the first object and a coordinate value of the first viewpoint.

7. The image processing apparatus of claim 1, wherein, when the distance between the first object and the first point is less than a second predetermined threshold which is less than the first predetermined threshold, the second calculator renders the second image by calculating a pixel value of the second image without using the pixel value of the first image associated with the first object.

8. An image processing apparatus, comprising:
a first calculator, using a processor, to calculate a pixel value of a first pixel of a first image rendered at a first viewpoint with respect to a three-dimensional (3D) model that includes at least one object; and
a second calculator to calculate a pixel value of a second pixel of a second image by assigning the pixel value of the first pixel as the pixel value of the second pixel, when a distance between a first object corresponding to the first pixel and a first point is greater than or equal to a first predetermined threshold, the second pixel having a same index value as the first pixel, the second image being rendered at a second viewpoint with respect to the 3D model,
wherein, when the distance between the first object and the first point is less than the first predetermined threshold, the second calculator calculates the pixel value of the second pixel by shifting the index value of the first pixel by a predetermined level and assigning the shifted pixel value of the first image associated with the first object as the pixel value of the second image,
wherein the first point corresponds to a point between the first viewpoint and the second viewpoint.

9. The image processing apparatus of claim 8, wherein the second calculator uses the pixel value of the first pixel to calculate a pixel value of a third pixel at a shifted location of the first pixel in the second image when the distance between the first object corresponding to the first pixel and the first point is greater than or equal to a second predetermined threshold and is less than the first predetermined threshold.

10. The image processing apparatus of claim 9, wherein a level of the shifting is in inverse proportion to the distance between the first object and the first point.

11. An image processing method, comprising:
rendering a first image observed at a first viewpoint with respect to a three-dimensional (3D) model that includes at least one object at an image processing apparatus; and
rendering a second image observed at a second viewpoint with respect to the 3D model by assigning a pixel value of the first image associated with a first object within the 3D model as a pixel value of the second image, when a distance between the first object and a first point is greater than or equal to a first predetermined threshold, at the image processing apparatus,
wherein, when the distance between the first object and the first point is less than the first predetermined threshold, the rendering of the second image comprises shifting the pixel value of the first image associated with the first object by a predetermined level, and assigning the shifted pixel value of the first image associated with the first object as a pixel value of the second image,
wherein the first point corresponds to a point between the first viewpoint and the second viewpoint.

12. The image processing method of claim 11, further comprising shifting the pixel value of the first image associated with a second object of the at least one object to render the second image observed at the second viewpoint with respect to the 3D image when a distance between the second object and the first point is greater than or equal to a second predetermined threshold and is less than the first predetermined threshold.

13. The image processing method of claim 11, further comprising generating a stereoscopic image by synthesizing the first image and the second image.

14. The image processing method of claim 11, wherein the rendering the first and second images is performed using a ray tracing scheme.

15. A non-transitory computer-readable recording medium storing a program to implement the method of claim 11.

16. An image processing method, comprising:
rendering a first image observed at a first viewpoint with respect to a three-dimensional (3D) model that includes at least one object at an image processing apparatus; and
rendering a second image observed at a second viewpoint with respect to the 3D model by:
determining whether a distance from the first viewpoint to a first pixel of the at least one object is greater than or equal to a first predetermined threshold, and storing a pixel value of the first pixel as a pixel value of a second pixel of the second image, if the distance between the first pixel and the first point is greater than or equal to the first predetermined threshold,
if the distance between the first pixel and the first point is less than the first predetermined threshold, determining whether the distance from the first viewpoint to the first pixel of the first image is greater than or equal to a second predetermined threshold, and storing the pixel value of the first pixel as a pixel value of the second pixel of the second image and storing a location of the first pixel as a location of the second pixel of the second image which is shifted by a predetermined amount from the location of the first pixel, if the distance between the first pixel and the first point is greater than or equal to the second predetermined threshold,
wherein the first point corresponds to a point between the first viewpoint and the second viewpoint.

* * * * *

UNITED STATES PATENT AND TRADEMARK OFFICE
CERTIFICATE OF CORRECTION

| | | |
|---|---|---|
| PATENT NO. | : 8,760,446 B2 | Page 1 of 1 |
| APPLICATION NO. | : 12/662287 | |
| DATED | : June 24, 2014 | |
| INVENTOR(S) | : In Woo Ha | |

It is certified that error appears in the above-identified patent and that said Letters Patent is hereby corrected as shown below:

On the Title Page

Column 2, Item [56] (Other Publications), Line 3, Delete ""(""" and insert -- " --, therefor.

Signed and Sealed this
Fourth Day of November, 2014

Michelle K. Lee
*Deputy Director of the United States Patent and Trademark Office*